Dec. 7, 1926.　　　　　　　　　　　　　　　1,609,675
G. H. VERNON
WHEEL
Filed April 8, 1924
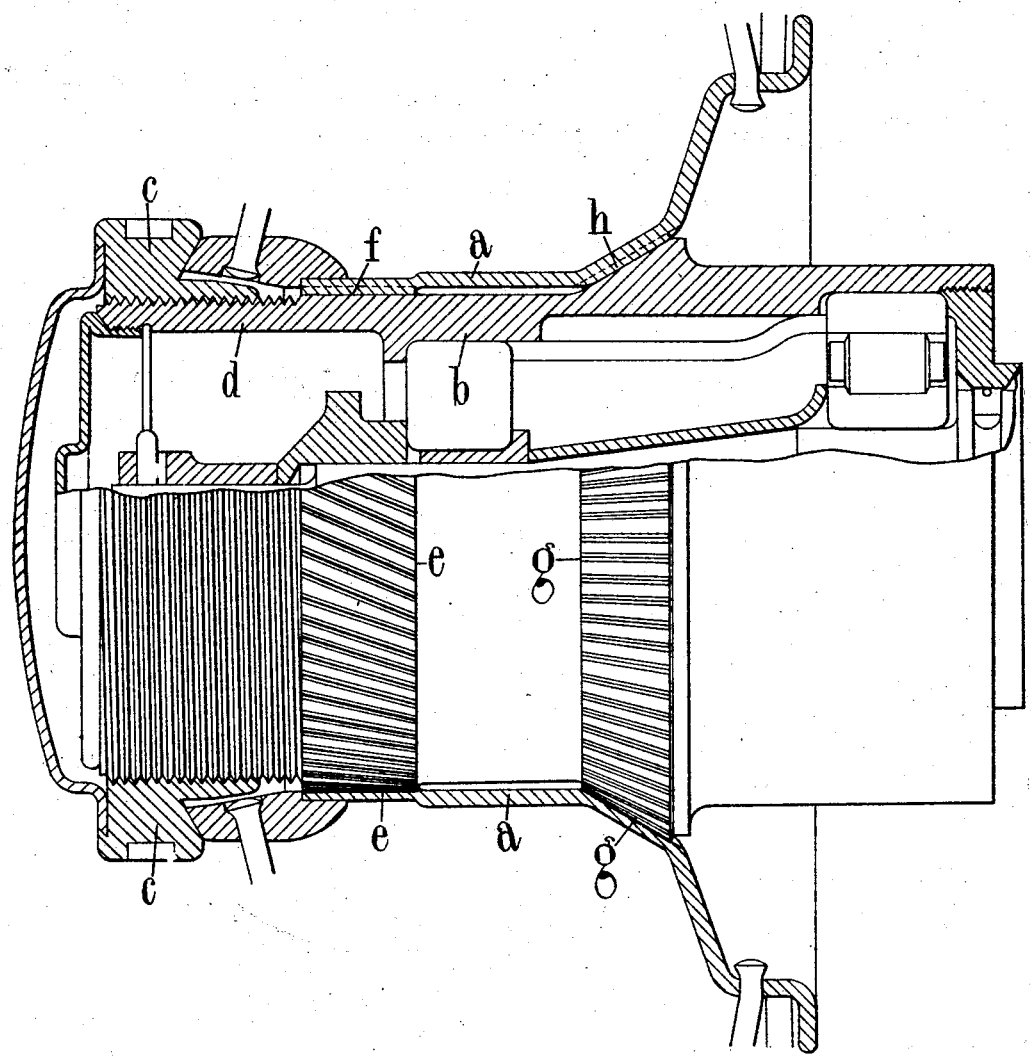
Geo. H. Vernon
 INVENTOR
By: Marks & Clerk
 Attys Patented Dec. 7, 1926.

1,609,675

UNITED STATES PATENT OFFICE.

GEORGE HAROLD VERNON, OF COVENTRY, ENGLAND, ASSIGNOR TO RUDGE-WHITWORTH, LIMITED, OF COVENTRY, WARWICK, ENGLAND.

WHEEL.

Application filed April 8, 1924. Serial No. 705,074.

This invention relates to rotational driving connections or couplings of that kind in which an outer member is sleeved upon an inner member for the purpose of rotating in unison therewith, and at two separate locations in the length of the sleeved connection sets of complementary engaging means are provided which are inclined to one another as helices or the like in such a manner that the forcing of the outer member upon the inner member in an axial direction eliminates any slackness in the driving connection and sets up torsional stresses in the material of the two members between the two sets of driving means.

The object of the present invention is to provide a driving connection which when rotating in either direction affords ample contact surface to withstand the forces which are transmitted, while the act of assembly brings the two sets of surfaces in forcible contact with one another and engagement is effected without introducing a wedging or jamming action which may hinder the subsequent ready separation of the parts.

The invention consists in the improved rotational driving connection as hereinafter described and subsequently pointed out in the claims.

The accompanying drawing shows a demountable wheel hub having driving connections of the kind indicated, the outer hub part being in section throughout and the inner hub part being in section in the upper and in elevation in the lower part of the figure.

In the convenient embodiment of the invention illustrated by way of example in the accompanying drawing, a detachable wheel hub has an outer hub part or shell, $a$, which is sleeved upon an inner hub part $b$ and a nut or other retaining means $c$ to force the outer hub part to and retain it at its final position upon the inner hub part.

The nut $c$ is screwed upon a threaded portion $d$ and next to this is a ring of buttress teeth $e$ having upright faces and sloping backs like saw or ratchet teeth, disposed in a helical direction upon a cylindrical surface of the inner hub part. Within the outer hub part $a$ is a complementary set of teeth $f$ so formed that one ring of teeth fills the spaces between and is slidable into the other in an axial direction so as to operate as splines, while a relative rotational movement also results from the helical disposition of the teeth.

Towards the other end of the inner hub is a conical surface upon which is a ring of teeth $g$ of buttress section facing in the opposite direction to the first-mentioned teeth and shaped as hereinafter more fully described. Within the outer hub part a complementary set of buttress teeth $h$ are formed. When the faces of the cone teeth of the inner and outer hub parts engage one another they act as abutments and relative movement of the parts is arrested.

The faces of the teeth $g$ and $h$ preferably correspond to parts of planes passing through the axis of the hub as under these conditions variations in adjustment or the like will not interfere with contact upon the full area of the faces. The backs of these teeth is an approximation to the surface generated on the one hub part during their relative movement by a line representing the most protruding region of the next adjacent tooth of the other hub part. This is in order to reduce the necessary clearance between these complementary rings of teeth to a minimum and obtain a strong form of tooth and plenty of contact surface, the backs of the teeth being just able to pass one another as the contact faces of each ring enter the spaces of the other ring prior to contact of the faces.

When sliding the outer hub part on to the inner hub part the rings of teeth $e$ and $f$, which may be considered as constituting spline elements, engage one another first and after further movement the cone surface defined by the tops of the ring of abutment teeth $h$ will coincide approximately with cone surfaces defined by the tops of the ring of abutment teeth $g$. Between this position and the final or stop position of the two hub parts or, in other words, while the tooth faces of each ring of abutment teeth enter the zone swept out by the tooth faces of the other ring the relative rotational movement must not exceed the distance from one abutment tooth face to the next while the relative axial movement during the same period should approximate to the length of a line drawn parallel to the axis from the top to the bottom of an abutment tooth face.

In the construction given by way of example the teeth of the cylindrical region may be about 1 inch in length and those of the conical regions about 9 inches and the radial depth of the teeth may be about .05 inch but will be decided by practical considerations in which the thickness of the material will form an important feature, and the desirable angle for the sloping backs of the teeth will be largely influenced by the form necessary to sustain the load on a tooth. The general shape having been thus decided, the angle of the conical toothed region must increase or decrease with the angle that the helix of the teeth e, f makes with a line drawn on the cylindrical surfaces parallel with the axis if it is desired to maintain the same tooth shape. The above angle of the helix may be decided from the consideration of avoiding jamming or sticking on withdrawal and also avoiding too great a mechanical advantage and consequent stress due to tightening up the retaining nut, while a small angle of the conical toothed region gives an increased axial movement from the point of the passing of the last pairs of teeth which clear one another to the position of final engagement, which is of considerable advantage.

The faces of the buttress teeth have been referred to as radial or lying in a plane containing the axis of the hub and such a form will probably be convenient from a practical or manufacturing point of view, as also the use of teeth of substantially similar dimensions in both sets in order that the contact surface for transmitting the rotational forces shall be about the same in each. In some cases, however, it may be desirable to form the faces of the buttress teeth as portions of planes tangential to a cylinder coaxial with the axis of the hub or some solid of revolution other than a cylinder may be found convenient in certain cases.

The buttress teeth on the cylindrical portion of the structure might also be replaced with V-shaped or other forms of teeth if found more convenient from a practical point of view. By forming the abutment teeth in accordance with this invention it is possible to avoid to a large extent, or almost entirely, clearance on the backs of the teeth as the backs are made to just pass one another as the teeth of each ring are entering the spaces of the other ring and thus the whole of the material provided by the circumference of the interengaging rings is rendered useful for supporting and transmitting the forces from the one hub part to the other, the material thus being used to the best advantage.

The true form of the sloping backs of the abutment teeth may be generated by a straight line inclined to the axis, or this line may be curved or otherwise, if desirable, for conforming to any other necessities of the construction. The actual shape of the backs will be an approximation to the true form and as near as convenient for manufacturing purposes.

In the embodiment described the teeth upon the cylindrical surface have been described as helical and the teeth upon the conical surface as having radial faces corresponding to parts of planes passing through the axis. It is, of course, obvious that so long as there is a difference and the teeth of one belt are inclined to the teeth of the other belt it does not matter which of them is straight and which is helical or, indeed, both could be helical with a difference between them.

Having now described my invention, what I claim as new and desire to secure by Letters Patent is:—

1. A wheel hub rotational driving connection comprising in combination an inner hub part, a belt of teeth uniform in cross-section near one end thereof, a second tooth belt not greatly differing in width on a region of progressively increasing diameter nearer to the other end, the teeth of at least one belt being helically disposed to the axis of the device, an outer hub part surrounding said inner hub part, a belt of teeth therein adapted to slidably engage said uniform section belt and a second belt of teeth in the outer hub part complementary to the second tooth belt on the inner hub part, which engages fully therewith in the act of arresting relative movement of the two hub parts.

2. A wheel hub rotational driving connection comprising in combination an inner hub part, a ring of teeth constituting splines near one end thereof, a second ring of teeth constituting abutments not greatly differing in length from the spline teeth, occupying a frusto-conical-like region nearer to the other end, the teeth of at least one ring being helically disposed to the axis of the device, an outer hub part slidable on to said inner hub part, a ring of teeth in the outer hub part slidably engaging said spline teeth and a second ring of teeth in the outer hub part complementary to the abutment teeth and affording substantially equivalent contact surface for transmitting rotational forces when relative movement of the two hub parts is arrested by their engagement.

3. A wheel hub rotational driving connection comprising in combination an inner hub part, a ring of teeth occupying an otherwise cylindrical region near one end thereof, a second ring of teeth of not greatly different length from the first teeth, occupying a frusto-conical-like region nearer to the other end, the teeth of said two rings being dissimilarly inclined to planes passing through them and containing the axis of the device, an outer hub part sleeved upon said inner hub part, a ring of teeth in the outer hub part complementary to and adapted to slide freely in said ring of teeth on the cylindrical region of the inner hub part and a second ring of teeth in the outer hub part complementary to the second ring of teeth on the inner hub part, which upon full engagement therewith arrests further relative movement of the two hub parts.

4. A wheel hub rotational driving connection comprising in combination an inner hub part, a ring of teeth helically disposed upon an otherwise cylindrical region near one end thereof, a second ring of buttress-shaped teeth of not greatly different length from the first teeth with contact faces not greatly removed from planes containing the axis of the device disposed upon a frusto-conical-like region nearer to the other end, an outer hub part sleeved upon said inner hub part, a ring of teeth in the outer hub part complementary to and adapted to slide freely in said helically-disposed teeth and a second ring of teeth in the outer hub part complementary to the buttress-shaped teeth, said buttress teeth being spaced a distance apart equal to the circumferential movement that one ring executes relative to the other while the contact faces of each ring enter the zone swept by the contact faces of the other.

5. A wheel hub rotational driving connection comprising in combination an inner hub part, a ring of helically-disposed buttress-shaped teeth constituting splines near one end thereof, a second ring of teeth of not greatly different length from the spline teeth constituting buttress-shaped abutments with faces oppositely directed and not greatly removed from planes containing the axis of the device, occupying a frusto-conical-like region nearer to the other end, an outer hub part sleeved upon said inner hub part, a ring of teeth in the outer hub part complementary to and adapted to slide freely in said spline teeth and a second ring of teeth in the outer hub part with faces complementary to the faces of the abutment teeth on the inner hub part, while the backs of both rings of abutment teeth are shaped to just pass one another as the teeth enter the spaces in the two rings.

6. A wheel hub rotational driving connection comprising in combination an inner hub part, a ring of buttress-shaped teeth helically disposed upon an otherwise cylindrical region near one end thereof, a second ring of buttress-shaped teeth of not greatly different length from the first teeth and with oppositely directed faces not greatly removed from planes containing the axis of the device disposed upon a frusto-conical region nearer to the other end, an outer hub part sleeved upon said inner hub part, a ring of teeth in the outer hub part complementary to and adapted to slide freely in said helically-disposed teeth and a second ring of teeth in the outer hub part complementary to the frusto-conical ring of teeth, said frusto-conical rings having their teeth spaced apart a distance equal to the circumferential movement that one ring executes relative to the other while the tooth faces of each ring enter the zone swept out by the tooth faces of the other ring.

In testimony wherof I have signed my name to this specification.

GEORGE HAROLD VERNON.